United States Patent [19]

Johnson

[11] Patent Number: 4,832,895
[45] Date of Patent: May 23, 1989

[54] BORON-CONTAINING CERAMICS THROUGH THE CHEMICAL CONVERSIAN OF BORANE-CONTAINING POLYMERS

[75] Inventor: Robert E. Johnson, Hoboken, N.J.

[73] Assignee: Hoechst Celanese Corporation, Somerville, N.J.

[21] Appl. No.: 82,761

[22] Filed: Aug. 7, 1987

Related U.S. Application Data

[63] Continuation-in-part of Ser. No. 933,413, Nov. 21, 1986, abandoned.

[51] Int. Cl.$^4$ ................................................. D01F 9/08
[52] U.S. Cl. ............................ 264/29.1; 264/29.2; 264/29.6; 264/56; 264/82; 264/83; 264/176.1; 264/183; 264/204; 264/211.14; 264/211.19; 501/95; 501/96; 423/291
[58] Field of Search ............... 501/49, 95, 96; 568/1, 568/4, 5, 7; 556/403; 149/19.2, 19.3, 22, 121; 264/29.1, 29.2, 56, 60, 65, 82, 83, DIG. 19, 176.1, 183, 204, 211.14, 211.19; 423/447.1, 447.3, 447.5, 447.7, 290, 291, 440

[56] References Cited

U.S. PATENT DOCUMENTS

| | | | |
|---|---|---|---|
| 2,925,440 | 2/1960 | Burg et al. | 260/606.5 |
| 3,025,326 | 3/1962 | Burg et al. | 260/606.5 |
| 3,035,949 | 5/1962 | Parshall | 149/22 |
| 3,071,552 | 1/1963 | Burg | 260/2 |
| 3,093,687 | 6/1963 | Clark et al. | 149/19.2 |
| 3,131,224 | 4/1964 | D'Alelio | 149/22 |
| 3,138,602 | 6/1964 | Szymanski et al. | 149/22 |
| 3,183,216 | 5/1965 | Cohen et al. | 149/22 |
| 3,351,616 | 11/1967 | Green et al. | 260/75 |
| 3,359,304 | 12/1967 | Bobinski et al. | 260/485 |
| 3,362,860 | 1/1968 | D'Alelio | 149/19.2 |
| 3,441,389 | 4/1969 | Yolles | 23/358 |
| 3,859,043 | 1/1975 | Duffy | 8/130.1 |
| 4,081,484 | 3/1978 | Hongh | 568/4 |
| 4,097,294 | 6/1978 | Rice et al. | 106/43 |
| 4,581,468 | 4/1986 | Paciorek et al. | 556/403 |

FOREIGN PATENT DOCUMENTS

0727170  2/1966  Canada ................... 568/4
912530  12/1962  United Kingdom .

OTHER PUBLICATIONS

C & En 12/9/63, pp. 62–70, "New Organoborane Compounds are Stable".
"Polymers from Decaborane", *Polymer Letters*, vol. 2, 1964, pp. 987–989.
"Types of Polymer Combination Among the Non-Metallic Elements", by Anton B. Burg, *Chemical Society (London) Spec. Publ.* No. 15, 1961, pp. 17–31.

*Primary Examiner*—Jan H. Silbaugh
*Assistant Examiner*—Hubert C. Lorin
*Attorney, Agent, or Firm*—DePaoli & O'Brien

[57] ABSTRACT

A process for producing boron-containing ceramics such as boron carbide and boron nitride comprises pyrolyzing a blend of a precarbonaceous polymer such as polyacrylonitrile and a boron-containing polymer such as that formed by the reaction of a borane with a Lewis base. Pyrolyzation in an inert atmosphere yields boron carbide while pyrolyzation in a reactive gas burns away the precarbonaceous polymer and yiels a ceramic comprising the reaction product of boron and the pyrolyzation gas. Boron nitride ceramics are formed by pyrolyzing the preceramic blend in ammonia.

24 Claims, No Drawings

BORON-CONTAINING CERAMICS THROUGH THE CHEMICAL CONVERSIAN OF BORANE-CONTAINING POLYMERS

This application is a Continuation-In-Part application of U.S. Ser. No. 933,413, filed Nov. 21, 1986, now abandoned.

FIELD OF THE INVENTION

The present invention is directed to the formation of boron-containing fibers. More specifically, the present invention is directed to a method of forming boron carbide and boron nitride fibers from boron-containing polymers.

BACKGROUND OF THE INVENTION

In the search for high performance materials, considerable interest has been focused upon carbon fibers. The terms "carbon" fibers or "carbonaceous" fibers are used herein in the generic sense and include graphite fibers as well as amorphous carbon fibers. Graphite fibers are defined herein as fibers which consist essentially of carbon and have a predominant x-ray diffraction pattern characteristic of graphite. Amorphous carbon fibers, on the other hand are defined as fibers in which the bulk of the fiber weight can be attributed to carbon and which exhibit an essentially amorphous x-ray diffraction pattern.

Industrial high performance materials of the future are projected to make substantial utilization of fiber reinforced composites, and carbon fibers theoretically have among the best properties of any fiber for use as high strength reinforcement. Among these desirable properties are corrosion and high temperature resistance, low density, high tensile strength and high modulus. During such service, the carbon fibers commonly are positioned within the continuous phase of a resinous matrix (e.g. a solid cured epoxy resin). Uses for carbon fiber reinforced composites include aerospace structural components, rocket motor casings, deep-submergence vessels, ablative materials for heat shields on re-entry vehicles, strong lightweight sports equipment, etc.

As is well known in the art, numerous processes have heretofore been proposed for the thermal conversion of organic polymeric fibrous materials (e.g. an acrylic multifilamentary tow) to a carbonaceous form while retaining the original fibrous configuration substantially intact. During commonly practiced carbon fiber formation techniques, a multifilamentary tow of substantially parallel or columnized carbon fibers is formed with the individual "rod-like" fibers lying in a closely disposed side-by-side relationship. See for instance, the following commonly assigned U.S. Pat. Nos. 3,539,295; 3,656,904; 3,723,157; 3,723,605; 3,775,520; 3,818,082; 3,844,822; 3,900,556; 3,914,393; 3,925,524; 3,954,950; and 4,020,273.

Recently, there has been interest in the use of ceramic materials, including ceramic fibers for a number of high temperature, high performance applications such as gas turbines. These applications require a unique combination of properties such as high specific strength, high temperature mechanical property retention, low thermal and electrical conductivity, hardness and wear resistance, and chemical inertness.

Among the ceramic materials which have been suggested are those made from organosilicon polymers. Thus, polymers based on silicon, carbon and/or nitrogen and oxygen have been developed. See, for example, "Siloxanes, Silanes and Silazanes and the Preparation of Ceramics and Glasses" by Wills et al, and "Special Heat-Resisting Materials from Organometallic Polymers" by Yajima, in Ceramic Bulletin, Vol. 62, No. 8, pp. 893–915 (1983), and the references cited therein.

Other metallic polymers can be formed into ceramic materials. Thus, U.S. Pat. No. 4,581,461 forms boron nitride by pyrolyzing B-triamino-N-tris (trialkylsilyl)-borazines. The formation of aluminum nitride fibers is disclosed in commonly assigned, copending application Ser. No. 872,312, filed June 9, 1986. Aluminum nitride ceramics are formed by thermal conversion of poly-N-alkyliminoalanes. Ceramics comprising silicon carbide and aluminum nitride solid solutions are also disclosed. These ceramic alloys are formed by thermal conversion of a mixture of an organosilicon preceramic polymer and the above-mentioned aluminum-containing polymer. Moreover, many recent patents describe specific silicon-containing preceramic polymers which are formed into silicon carbide and/or nitride upon thermal treatment.

Another technique which has been suggested for producing ceramic fibers such as metal carbide fibers has involved incorporating metallic additives into a carbon fiber product, the precarbonaceous polymer forming solution, the polymer spinning solution or the polymer fiber subsequent to spinning, and converting the metallic compounds in situ to metal carbides upon thermal conversion. In these methods the precarbonaceous polymer acts as the source of carbon.

An important ceramic fiber formed by such method is boron carbide and boron carbide-containing carbon fibers. The addition of boron carbide to carbon fiber is known to increase fiber strength and, more particularly, to increase the oxidative stability of carbon fibers such that the boron carbide-containing carbon fibers can withstand high temperature environments. Methods of incorporating boron into carbon fibers to form boron carbide fibers have typically involved treating the carbon fibers with gaseous boron halides or impregnation with boric oxides including boric acid, metallic borates and organic borates including alkyl and aryl borates. Upon being treated with the boron compounds, the fibers are heated to initiate reaction of boron with the carbon fibers to yield boron carbide.

For producing an ideal boron carbide fiber, boron levels in the fibers much reach about 78 wt. %. Unfortunately, prior processes for producing boron carbide fibers such as treating carbon fibers with boric acid have typically yielded only small boron loadings, e.g., 2–5 wt. %. Such small boron loadings do not result in any appreciable improvement in the oxidative stability of the loaded carbon fibers at elevated temperatures.

Examples of U.S. patents which disclose incorporating boron into carbon fibers and other shaped articles are discussed below.

U.S. Pat. No. 3,399,979 discloses a method of forming nitride articles by a process which involves impregnating a preformed organic polymeric material with a metal-containing compound, heating the impregnated polymer to carbonize the polymer and heating in an atmosphere containing nitrogen-containing compounds such as ammonia to produce the metal nitride. More specifically, a method is disclosed of immersing a rayon yarn in an aqueous solution of ammonium decaborane and treating the impregnated yarn in ammonia to form boron nitride.

U.S. Pat. No. 3,403,008 discloses a process for producing metal carbide fibers and the like which comprises treating an organic polymeric fiber with a solution containing a metallic compound, heating the metal compound-imbibed polymer to form the carbonaceous fiber and further heating the fiber in a nonoxidizing atmosphere to react the metal with the carbonaceous fiber to form a metal carbide. Among the metal carbides which can be formed is boron carbide obtained by treating the organic fiber with a boric acid solution.

U.S. Pat. No. 3,672,936 discloses providing a reinforced carbon or graphite article having improved oxidation resistance and increased strength by incorporating therein the in-situ reaction product of carbon and a boron containing additive. The process involves making a carbon article such as carbon fiber, dispersing the boron containing additive with at least a portion of the carbon fiber, impregnating the carbon fiber with a carbonizable binder, and heating the fiber to carbonize the binder and to form in-situ the reaction product of carbon and the boron containing additive. Boron containing additives include metal borides, boron nitride, or boron silicides as well as elemental boron.

U.S. Pat. No. 3,971,840 discloses a process of forming a carbide containing fiber of improved strength by a process of heating a carbonaceous fiber in the vapor of a halide of a carbide forming element and heating the fiber under a controlled degree of tension to result in the formation of the carbide. A boron carbide fiber can be formed by treating a carbon fiber with boron trichloride.

U.S. Pat. No. 4,010,233 discloses a method of producing an inorganic fiber comprising a metal oxide phase and finely divided dispersed phase. Boron compounds such as boranes can be used to provide the dispersed phase in the fibers.

U.S. Pat. No. 4,097,294 suggests that a boron carbide ceramic is obtainable from a carborane carbon polymer and that a boron nitride ceramic is obtainable from a borazene polymer. A mixed ternary ceramic is obtained from a polymer with a repeating unit of $[C_2B_{10}H_{10}R_2Si(R_2SiO)_n]_x$, wherein n is 1 to 10 and x is greater than 4.

U.S. Pat. No. 4,126,652 discloses a method of forming metal carbide articles especially fibers by reacting a metal powder with a carbon fiber such as has been formed from polyacrylonitrile. The fiber may be produced by subjecting a monomer mixture mainly comprising acrylonitrile to solution polymerization with addition of the powdery metal prior to, in the course of, or after the polymerization so as to disperse the metal powder into the polymerization mixture, or alternatively dispersing the powdery metal into a solution of the acrylonitrile polymer in a suitable solvent, and then subjecting the thus obtained powdery metal-containing mixture to molding by a conventional dry or wet method. An example of forming a boron carbide fiber comprises mixing dimethylformamide, non-crystalline boron and polyacrylonitrile to obtain a viscous dispersion and spinning the viscous liquid into fiber which is then heated up to 1800° C. to form the boron carbide.

U.S. Pat. No. 4,197,279 discloses an acrylic carbon fiber with excellent thermal oxidation resistance which contains a phosphorus component and/or a boron component as well as a zinc and/or calcium component. The carbon fibers can be produced by incorporating the above components into the fibers including the acrylic fibers or into the carbon fibers which are produced. For example, the above described compounds can be added to the reaction mixture to produce the acrylic polymer or to a solution of the acrylic polymer before spinning into the fibers. Compounds are added in desired amounts as an aqueous or organic solution or dispersion thereof. Suitable boron compounds which can be used include boric acids, boric acid salts of metals and boric esters such as alkyl borates. The amount of boron included in the fibers is measured in parts per million with amounts as high as only 5100 ppm being described. Similar to this patent is U.S. Pat. No. 4,412,937 which discloses adding 0.01 to 0.03% by weight boron onto a carbon fiber formed from acrylic polymer.

U.S. Pat. No. 4,424,145 discloses a carbon fiber derived from mesophase pitch which has been boronated and intercalated with calcium so that the fiber contains from about 0.1% by weight to about 10% by weight boron and the calcium to boron weight ratio in the fiber is 2:1. The boronating step can be carried out with elemental boron, $BCl_3$, boranes, or water soluble compounds of boron such as boric acid.

There still exists in the art a need to provide an improved process for producing boron-containing fibers. Thus, there is a need to form boron carbide-containing fibers which have improved oxidation resistance relative to carbon fibers such that the fibers can find increased use in the high temperature, high performance application for which such fibers have vast potential. There is a need to produce improved boron carbide fibers which contain boron in amounts greater than what has heretofore been achieved in the art. Moreover, boron nitride has use as an electrical insulator, a neutron insulator and is corrosion resistant and is, thus, a very useful ceramic which would be advantageous in fiber form.

Accordingly, a principle object of the present invention is to provide boron-containing fiber with increased boron content.

Another object of the invention is to provide boron carbide fibers which have increased oxidative stability at elevated temperatures relative to carbon fibers.

Another object of the present invention is to provide improved boron carbide fibers and an improved process for forming same.

Yet another object of the present invention is to provide improved boron nitride fibers and to an improved process for forming same.

These and other objects and advantages of the invention will be apparent upon consideration of the following description of the embodiments set forth in the description of the invention and the appended claims.

SUMMARY OF THE INVENTION

In accordance with the present invention boron-containing fibers are provided by forming a blend of a boron-containing polymer and a precarbonaceous polymer, shaping the blend into a fiber such as by spinning, and pyrolyzing to form a fiber comprising a boron ceramic. The particular boron ceramic which is formed will depend upon the pyrolyzation atmosphere. Thus, pyrolyzing the spun fiber in an inert gas will yield a boron carbide fiber whereas pyrolyzing in ammonia will lead to a boron nitride fiber. Other pyrolyzation atmospheres such as phosphine or metalloid-containing gases will lead to the formation of a boron phosphide, etc. By precarbonaceous polymer is meant any polymeric material which can be converted into carbon at elevated temperatures. The boron-containing polymers such as a polymeric borane used in the present invention can, for example, be formed by condensation of a borane with a Lewis base and are typically of low molecular weight, poorly characterized and are difficult to spin into fibers. However, by forming a spinning composition comprising a blend of a precarbonaceous polymer such as polyacrylonitrile with the boron-containing polymer, a boron loaded fiber can be produced which has substantially greater boron loadings than achieved by the impregnation methods of the prior art and in view of the polymeric nature of the boron component, can be more readily spun into fibers than methods employing inorganic materials as the boron source.

DESCRIPTION OF THE PREFERRED EMBODIMENTS

The precarbonaceous polymers to be used in the present invention are those polymeric materials whether natural pitches or the like or synthetic polymers which can be molded, preferably spun into fibers, and can be carbonized to yield a carbon article or burned off completely. A particularly preferred polymer is polyacrylonitrile (PAN) and copolymers thereof which are used in the formation of carbon fibers. Thus, polymers containing not less than about 80% by weight of units of acrylonitrile are favorable. When the acrylonitrile polymer is a copolymer, the other monomeric units may be derived from any monomer copolymerizable with acrylonitrile of which preferred examples are acrylic acid and esters thereof such as methyl acrylate, ethyl acrylate, 2-chloroethyl acrylate, 2-hydroxy-3-chloropropyl acrylate, 2,3-dibromopropyl acrylate, tribromophenyl acrylate, 2-hydroxyethyl acrylate, 2-methoxyethyl acrylate, methoxypolyoxyethylene acrylate and N,N-dimethylaminoethyl acrylate, methacrylic acid and esters thereof corresponding to the above mentioned acrylic acid esters, derivatives of acrylic acid esters such as methyl 2-hydroxymethylacrylate and methyl 2-hydroxymethylmethacrylate, itaconic acid and ester derivatives thereof, allylamine and derivatives, diallylamine and derivatives, phosphorus-containing monomers such as dimethyl 2-cyano-1-methylallylphosphonate, dimethyl 2-cyano-allylphosphonate and dimethyl 2-ethoxycarbonyl allylphosphonate, styrene and derivatives such as sodium p-styrenesulfonate, chloromethylstyrene and 1-methylstyrene, vinyl acetate, acrylamide, dimethylacrylamide, diacetacrylamide, methyl vinyl ketone, methyl isopropenyl ketone, methacrylonitrile, vinylidene cyanide, 1-cyanovinyl acetate, 2-hydroxymethylacrylonitrile, 2-acetylaminomethylacrylonitrile, 2-methoxymethylacrylonitrile, 2-(1-hydroxyethyl)acrylonitrile, 2-ethoxymethylacrylonitrile vinylidene chloride, vinyl bromide, sodium allylsulfonate, sodium methallylsulfonate, allyl alcohol, methallyl alcohol, etc.

The molecular weight of the acrylonitrile polymer is usually in a range of about 30,000 to 300,000. More particularly, it may be preferably chosen in such a manner that the viscosity at the molding step becomes from about 50 to 10,000 poise.

Other suitable precarbonaceous polymers include polyisobutylene, polyisoprene, polystyrene, polymethyl methacrylate, polyvinyl alcohol, polyacrylamide, polyacrylic acid, polyethylene oxide, cellulose, carboxymethyl cellulose, hydrolyzed starch, dextran, guar gum, polyvinylpyrrolidone, polyurethane, polyvinyl acetate, and the like, and mixtures thereof.

As the boron source to be included in the mixture, borane-containing polymers are preferably used. Preferably, the borane-containing polymers are prepared by the condensation of boranes with Lewis bases. Such polymers are well known and prepared by condensing a borane such as diborane, pentaborane or decaborane with Lewis bases such as amines, amides, isocyanates, nitriles and phosphines. Any borane containing 2–10 boron atoms are useful. A particularly preferred borane-containing polymer is one formed by the condensation of decaborane and dimethylformamide (DMF). Such polymer has a high boron content, and since DMF is a typical solvent for PAN, polymerization and blending of the polymeric materials can be achieved in one step. The borane-Lewis base condensation polymers are known and described, for example, in POLYMER LETTERS, Vol. 2, pp. 987–989 (1964); Chemical Society (London) Spec. Publ. No. 15 (1961), "Types of Polymer Combination among the Non-metallic Elements", Anton B. Burg, pp. 17–31; U.S. Pat. Nos. 2,925,440; 3,025,326; 3,035,949; 3,071,552; and British Pat. No. 912,530, all of which are herein incorporated by reference. The borane-containing polymers are characterized by a low molecular weight, typically not exceeding 20,000, and more typically, ranging from about 400 to 5,000, and often between 400 and 2,000. The polymers which are formed are poorly characterized, some of which are linear and others of which are branched structures, are brittle and, thus, break apart readily and are not very stable. Accordingly, these borane-Lewis base condensation polymers are not easily shaped such as being spun into fibers.

Other borane-containing polymers can be used including those disclosed in U.S. Pat. No. 3,441,389 herein incorporated by reference. In this mentioned patent, borane polymers are prepared by heating a compound of the formula $(RAH_3)_2 \ B_{10}H_{10}$ or $(RAH_3)_2 \ B_{12}H_{12}$ at a temperature of 200°–400° C. for several hours. Moreover, borazines such as disclosed in U.S. Pat. No. 4,581,468 and carborane polymers such as suggested in U.S. Pat. No. 4,097,294 can also be cospun with the precarbonaceous polymer of this invention.

The boron-containing polymer and precarbonaceous polymer are blended to yield an article-forming mixture which mixture can be shaped by various methods known in the art. Thus, the blends of the present invention can be formed into sheets, films, or articles by molding, extrusion, die pressing, etc. The blends of this invention are more particularly spun into fibers by known spinning techniques. The relative proportions of the boron-containing polymer to precarbonaceous polymer can vary widely and will depend upon the article being formed and method of forming. Broadly, weight ratios of boron-containing polymer and precarbonaceous polymer can vary between 9:1 and 1:9. For the production of boron ceramic fibers, the weight ratio will preferably be more narrow with the amount of boron-containing polymer to precarbonaceous polymer ranging from a ratio of about 5:1 to 1:5, with weight ratios of 5:1 to 1:1 being most preferred.

The weight ratio of the boron-containing polymer to precarbonaceous polymer will also vary widely depending upon the particular boron ceramic which is desired. Thus, to form wholly boron carbide ($B_4C$) articles requires that the boron content in the blend be substantially greater than the carbon content provided by the precarbonaceous polymer. Accordingly, in such instance, it would be desirable to provide a blend which contained the minimum amount of precarbonaceous polymer as the carbon source. However, if the blend is to be shaped into fibers such as by spinning there may be a limit as to the amount of boron-containing polymer which can be included in the spinning blend inasmuch as the boron-containing polymers are of relatively low molecular weight and difficult to spin into fibers. On the other hand, if a boron nitride ceramic is to be formed, a low amount of the boron-polymer in the blend is not a disadvantage inasmuch as the precarbonaceous polymer is burned away during the pyrolyzation stage. The minimum amount of boron-containing polymer needed to form a boron nitride ceramic would be such amount as needed to form an intact boron nitride chain so as to maintain fiber integrity.

The present invention is particularly useful in the formation of boron ceramic fibers from a spinning composition comprising the blend of boron-containing polymer and precarbonaceous polymer. While it may be possible to melt spin the blend of the present invention, most likely the boron polymer will have a melting point far above the melting point of the precarbonaceous polymer which may be adversely effected at the temperatures required for melt spinning the boron-polymer. Accordingly, a solvent spinning method is preferred. Thus, spinning into fibers is preferably accomplished with either the wet or dry spinning techniques. In dry spinning, the spinning composition issues from the spinning apparatus through a spinning column wherein a stream of drying gas is simultaneously fed through the spinning column. The temperature of the spinning column and that of the drying gas is dependent on the volatiles which have to be evaporated from the filament during its passage through the spinning column. In wet spinning, the spinning dope is extruded into a spin bath where coagulation of the spinning solution and the formation of the fiber occurs. A variety of suitable solvent-nonsolvent systems are known in the fiber art for use as the coagulating medium or spin bath. Suitable spin baths are nonsolvents for the polymers contained in the spinning blend and do not chemically react with the spinning solution. The fiber which is formed is typically washed to remove any adhering traces of the spin bath, and then dried.

In most cases, the solvent diluent which is employed provides the spinning composition (i.e., a spinning dope) with a room temperature viscosity range between about 0.1–3,000 poises, and preferably between about 100–1,000 poises.

Any useful solvent can be employed. Nonlimiting solvents include those for use with a water-miscible polymer and which include water and/or water-miscible solvent such as methanol, ethanol, acetic acid, dimethylformamide, tetrahydrofuran, and the like. Solvents which can be used with an oil-soluble polymer include organic solvents such as benzene, hexane, dichloroethylene, dichloroethylene, dimethylacetamide, dibutylether, ethylacetate, and the like.

The boron-containing polymers must be soluble in the solvents used to dissolve the precarbonaceous polymer and form the spinning dope or at least be soluble in solvents compatible with the precarbonaceous polymer solvents. It is preferred that the solvent for the boron-containing polymer be the same as the solvent used to dissolve the precarbonaceous polymer. It is not absolutely necessary that the solvent for the boron-containing polymer and the precarbonaceous polymer be the same as long as the solvents are compatible. Compatibility as stated herein means the solvents will form a homogenous mixture.

The concentrations of the polymeric materials in the spinning solution can vary widely and will depend for one on the particular spinning process, e.g., dry or wet which is used to form the fibers. The concentration of the boron-containing polymer is the controlling factor in solubility and, thus, for greater amounts of boron-containing polymer required, the solution will have to be less concentrated. Typically, for wet spinning, concentrations of the polymeric materials between about 5 and 20% by weight will be used whereas for dry spinning, concentrations of up to about 80% are useful. It is extremely difficult to obtain boron-containing polymer concentrations near 80% and, thus, for dry spinning, a much higher level of the precarbonaceous polymer relative to the boron-containing polymer must be utilized. In such instance, the boron content of the formed fibers will be relatively low and, thus, dry spinning is not a preferred method of forming boron carbide fibers wherein the amount of boron relative to carbon must approach 3:1. On the other hand, the dry spinning process may be useful in forming boron nitride, boron phosphide or boron metalloid ceramic fibers inasmuch as the amount of boron-containing polymer needed is the minimum to form an intact fiber. High levels of the precarbonaceous polymer do not adversely effect the non-carbide ceramic products since the polymer is burned away and is not present as a carbon source. The amount of the precarbonaceous polymer therefore need not be controlled as in the case of the boron carbide fibers. Preferably, wet spinning is used to form the fibers since the greater amounts of solvent allow the use of a greater amount of boron containing polymer relative to the precarbonaceous polymer.

After a newly formed fiber is spun, it can be stretched or drawn to about 100–300% of its original length by conventional techniques.

The preceramic polymeric fiber can be converted to any one of a variety of fibrous configurations prior to undergoing thermal treatment. For example, the fiber can be in the form of filaments, staple fibers, tows, plied yarns, knits, braids, fabrics, or other fibrous assemblages while undergoing thermal treatment. Alternatively various fibrous configurations may be formed form the inorganic fibers at the conclusion of the pyrolysis step of the process.

To provide a final ceramic fiber product with optimal physical properties, it is preferred to subject the preceramic polymeric fiber from the preceramic fiber formation step to an initial thermal treatment in a molecular oxygen environment. The polymers in the preceramic fiber are partially carbonized to a stabilized form so that the subsequent pyrolysis step of the process can be effected without the concomitant destruction of the fibrous configuration. The thermal treatment step can be conducted by heating the fiber in a molecular oxygen-containing atmosphere at a temperature ranging between about 200°–600° C. The thermal treatment temperature selected is dependent upon the polymer resistance to distortion at elevated temperatures, and should not exceed the polymer melting point during at least the initial phase of the thermal treatment.

Volatile components that evolve during the thermal treatment step include water vapor and oxygen, and carbon monoxide and carbon dioxide resulting from a partial combustion of the polymers. Typically a 15–50% reduction in the weight of the fiber occurs during the thermal treatment step. It is believed that a crosslinking of carbon atoms occurs during the thermal treatment to produce a charred structure.

The thermal treatment can be performed in an autoclave by heating to the required temperature/time schedule. A continuous thermal treatment can be accomplished by the continuous passage of a fiber through a heated chamber or calcining furnace. The fibrous structure of the fiber is retained throughout the thermal treatment step. There is a tendency for the fiber to shrink while undergoing thermal treatment.

Alternatively, the preceramic fibers can be subjected to a chemical stabilization treatment before being subjected to the pyrolysis step. In a typical stabilization procedure, the dried fibers are contacted with a reactive free radical-forming agent such as diazidoformamide, which effects the desired crosslinked structure in the fiber substrate at ambient temperatures (e.g., 10°–40° C.).

In the subsequent pyrolysis step of the process, the preceramic fiber (either charred or uncharred) is subjected to a temperature between about 700°–2,500° C. (preferably about 1,100°–1,800° C.). The pyrolysis period normally will range between about 0.2–8 hours. Any pyrolysis gas can be utilized to pyrolyze the fibers. Thus, inert gases will lead to the formation of metal carbides while reactive gases including ammonia, phosphine, and metalloid-containing gases such as metal hydrides including germane, arsine, stibine, silane, etc. will lead to boron nitride, boron phosphides, and boron-metallic ceramics, respectively. Thus, if a carbide is desired, the pyrolyzation gas will be inert and the precarbonaceous polymer will be one that does not easily burn away so as to form a carbon structure which can be used for reaction. On the other hand, if the ceramic alloy is to be formed from reaction of the boron polymer and the pyrolyzing atmosphere, it may be desirable to use as the precarbonaceous polymer a polymer which burns off relatively easy.

The boron carbide fibers which are formed in accordance with the present invention have vastly increased levels of boron as compared with boron carbide fibers produced by using boric acid as a boron source. Thus, typical boron loadings of boron carbide fibers using boron containing polymers and, in particular, borane-containing polymers as the boron source as in the process set out in the present invention will be greater than 10% by weight with substantially higher boron loadings obtained depending upon the weight ratio of borane polymer to precarbonaceous polymer contained in the spinning solution. Accordingly, boron levels as high as about 40 and even as high as about 50–80 wt. % are achievable by the process of the present invention.

EXAMPLE 1

Five grams of polyacrylonitrile were dissolved in 50 ml of dimethylformamide by heating in water at about 50° C. Five grams of decaborane were added to the solution along with about 50 ml more of dimethylformamide. Vigorous hydrogen gas evolution was observed. The solution was shaked occasionally until the gas evolution stopped. The solution had a yellow to amber color.

The solution was poured into water with stirring to precipitate a white/yellow solid mass. Pockets of dimethylformamide which remained like blisters in the mass were punctured and the solid was collected after about five minutes in water. The mass was dried in an oven overnight at 90° C. under vacuum. The mass was further dried at 90° C. for about three hours. The solid which remained was a brittle white solid which contained brown specks.

8.22 grams of the solid was ground and placed in a quartz tube. A moderate argon flow was placed through the tube which was heated from room temperature to 1000° C. in about three hours and held at 1000° C. for another one half an hour. The argon flow was slowed and the tube cooled overnight. The material was in the form of a cylindrical, light density black solid which weighed 5.34 grams approximately 65% of the starting 8.22 grams. The solid was analyzed and found to contain greater than 40% by weight boron.

EXAMPLE 2

Two spinning solutions to produce boron carbide fibers were formed with decaborane as the boron source, polyacrylonitrile as the carbon source and dimethylformamide (DMF) as the solvent. The first spinning solution contained 1.5 grams of decaborane and 0.5 grams PAN in 12 ml DMF. The second spinning solution contained 15 grams of decaborane, 15 grams of PAN in 120 ml DMF. The respective spinning solutions were wet spun through a 70 micron aperture into a precipitating bath comprising 80% methanol and 20% dimethylacetamide at room temperature. The fibers were pyrolyzed in argon from room temperature to 1200° C. in three hours and maintained at 1200° C. for two hours. The fibers were allowed to cool for two days to room temperature. The pyrolyzed fibers were analyzed for boron content.

The first spinning solution containing a decaborane to PAN weight ratio of 3:1 yielded a boron carbide fiber containing 40% boron by weight. The second sample containing a decaborane to PAN ratio of 1:1 yielded a boron carbide fiber containing 15% boron by weight. As can be seen, the weight ratio of boron source to carbon source is important in the final boron content of the boron carbide containing fiber.

EXAMPLE 3

15.0 g decaborane are combined with 120 ml (113.3 g) DMF in a three-neck flask fitted with a mechanical stirrer. The solvent and decaborane are quickly deoxygenated and vigorously stirred for 2 hours. During this time the initial bright yellow-orange color is replaced by a less intense yellow while a white solid precipitates. Two equivalents of hydrogen gas are given off during the exothermic reaction. As a safety precaution the reaction flask can be immersed in a cold water bath without appreciably prolonging the reaction time.

The white solid is the bis(dimethylformamidato) complex of decaborane. The contents in the flask are heated to 100° C. with vigorous stirring to redissolve the solid. The solution is an amber color. No gas is evolved during the heating which lasts approximately one-half hour. The solution is carefully cooled to room temperature and precautions are taken to avoid exposing the solution while hot to oxygen. This solution is a condensation polymer of decaborane and DMF. The polymer will not reprecipitate at room temperature at concentrations of less than 1M.

15.0 g of polyacrylonitrile (PAN) is added to the condensation polymer solution and, the solution thoroughly purged of oxygen. With vigorous stirring, the slurry is heated to 100° C. After the PAN dissolves, the polymer mix is cooled.

A spinning dope is spun using a 100 micron jet and 5 lbs/in² N₂ pressure. The extruded dope is coagulated in a four foot water bath, collected and dried in air.

The dried extrudate is pyrolyzed in ammonia under an ammonia gas flow of 100 cc/min. The sample is brought from room temperature to 200° C. at a rate of 6° C. per minute and held for one hour. The temperature is then increased to 1100° C. at a rate of 5° C./min and held for two hours before cooling overnight. The sample contains over 75 weight percent boron nitride.

What is claimed is:

1. A process for producing a boron-containing ceramic with increased boron content comprising: pyrolyzing a blend of a precarbonaceous polymer and a preceramic boron-containing polymer which consists essentially of the reaction product of decaborane with a Lewis base at a temperature and in the presence of a pyrolyzing atmosphere sufficient to convert said blend to a boron-containing ceramic.

2. The process of claim 1 wherein said pyrolyzation atmosphere is an inert gas and said precarbonaceous polymer is pyrolyzed to provide a source of carbon which is reacted with the boron in said boron-containing polymer to form boron carbide.

3. The process of claim 1 wherein said pyrolyzation atmosphere comprises a gas reactive with boron and wherein said precarbonaceous polymer is burned away during pyrolysis, said reactive gas reacting with the boron in said boron-containing polymer to form a ceramic comprising the reaction product of said boron and said reactive gas.

4. The process of claim 3 wherein said reactive gas is a nitrogen-containing gas and said boron in said boron-containing polymer reacts therewith to form a boron nitride ceramic.

5. The process of claim 4 wherein said nitrogen-containing gas is ammonia.

6. The process of claim 1 wherein said precarbonaceous polymer is polyacrylonitrile.

7. A method of forming boron ceramic fibers of increased boron content comprising; forming a blend of a precarbonaceous polymer and a preceramic boron-containing polymer, said boron-containing polymer consisting essentially of the reaction product of decaborane with a Lewis base, spinning said blend into a fiber and pyrolyzing said spun fiber at a temperature and in an atmosphere sufficient to convert said blend to a boron-contained ceramic fiber.

8. The process of claim 7 wherein said pyrolyzation atmosphere is an inert gas and said precarbonaceous polymer is pyrolyzed to provide a source of carbon which is reacted with the boron in said boron-containing polymer to form boron carbide.

9. The process of claim 7 wherein said pyrolyzation atmosphere comprises a gas reactive with boron and wherein said precarbonaceous polymer is burned away during pyrolysis, said reactive gas reacting with the boron in said boron-containing polymer to form a ceramic comprising the reaction product of said boron and said reactive gas.

10. The process of claim 9 wherein said reactive gas is a nitrogen-containing gas and said ceramic is boron nitride.

11. The process of claim 10 wherein said nitrogen-containing gas is ammonia.

12. The process of claim 7 wherein said blend is dissolved in a solvent to form a spinning solution and said spinning is achieved by solvent spinning.

13. The process of claim 12 wherein said spinning is dry spinning.

14. The process of claim 12 wherein said spinning is wet spinning.

15. The process of claim 7 wherein said precarbonaceous polymer is polyacrylonitrile.

16. The process of claim 15 wherein said boron-containing polymer is a condensation product of decaborane and dimethylformamide.

17. The process of claim 16 wherein said pyrolyzation atmosphere is an inert gas and the formed boron ceramic is boron carbide.

18. The process of claim 16 wherein said pyrolyzation atmosphere is ammonia and said boron ceramic is boron nitride.

19. A process for producing a boron-containing ceramic of increased boron content comprising: pyrolyzing a preceramic borane-containing polymer at a temperature of at least 700° C. in the presence of a pyrolyzing atmosphere sufficient to convert said polymer to a boron-containing ceramic, said borone-containing polymer consisting essentially of the reaction product of decaborane with a Lewis base.

20. The process of claim 19 wherein said borane-containing polymer has a molecular weight ranging from about 400 to 20,000.

21. The process of claim 19 wherein said pyrolyzation atmosphere is an inert gas to form boron carbide or a reactive gas sufficient to form boron nitride.

22. The process of claim 19 wherein said borane-containing polymer is shaped by spinning said polymer into a fiber and subsequently pyrolyzed to form a boron-containing ceramic fiber.

23. The process of claim 22 wherein said borane-containing polymer has a molecular weight ranging from about 400 to 20,000.

24. The process of claim 22 wherein said pyrolyzation atmosphere is an inert gas to form boron carbide or a reactive gas sufficient to form boron nitride.

* * * * *